May 29, 1956 T. ULRICH 2,747,920
COWL VENTILATORS

Filed Dec. 8, 1952 2 Sheets-Sheet 1

INVENTOR.
THEODORE ULRICH
BY Carl J. Barbee
ATTORNEY.

May 29, 1956  T. ULRICH  2,747,920
COWL VENTILATORS
Filed Dec. 8, 1952  2 Sheets-Sheet 2

INVENTOR.
THEODORE ULRICH
BY Carl J. Barbee
ATTORNEY.

United States Patent Office 2,747,920
Patented May 29, 1956

2,747,920

COWL VENTILATORS

Theodore Ulrich, Detroit, Mich., assignor to American Motors Corporation, a corporation of Maryland Application December 8, 1952, Serial No. 324,647

2 Claims. (Cl. 296—28)

This invention relates to a ventilator construction and more particularly to cowl ventilators which are used in conjunction with an automobile body to provide an inlet for fresh air which is to be used in heating or conditioning the interior of an automobile.

It is an object of this invention to provide a cowl ventilator structure which is mounted on a fixed portion of an automobile adjacent the dash panel of the car, separate from the hood section which may be operated without interference by the ventilator and which is strategically placed for easy entrainment of air for heating or ventilating purposes without interference with the vision of the driver or other car occupant.

It is another object of this invention to provide a cowl ventilator construction including a pressure chamber arranged immediately adjacent a plurality of spaced openings through which air is received and entrained in said chamber and whereby such air is caused to flow over heated coils and disposed within the interior of an automobile. This chamber is of substantial breadth, depth and length as to afford ready reception of air through all the openings whereby large quantities of air may flow over such heated coils regardless of where the heating unit is placed in the dash panel. This chamber being of large proportions affords space of sufficient area to permit mounting of the windshield wiper motor without interference of the air being directed to the heated coils of the heater.

I am aware of the various constructions heretofore used with respect to entrainment of air in a cowl ventilator for distribution of air over heated coils prior to disbursement in an automobile interior. Under the circumstances it will be manifest that it is my chief aim to generally improve upon prior structures of the general type by providing an arrangement characterized by appreciable refinements and structural improvements.

In the previous constructions the cowl ventilator was of comparatively small size with definite limitations for the entrainment of the air. As such it was expedient that the cowl ventilator openings be arranged adjacent said heater so that the full power of the air be driven directly over heated coils. The correct locating placement of the heater was of extreme importance therefore to provide adequate heating of the automobile interior.

With my arrangement a more pleasing and efficient streamlining of the upper surface of the front part of an automobile is effected so as to present little interference to the air stream.

The several objects, advantages and novel details of construction of the invention will be made more apparent as this description proceeds, especially when considered in connection with the accompanying drawings, wherein.

Figure 1:
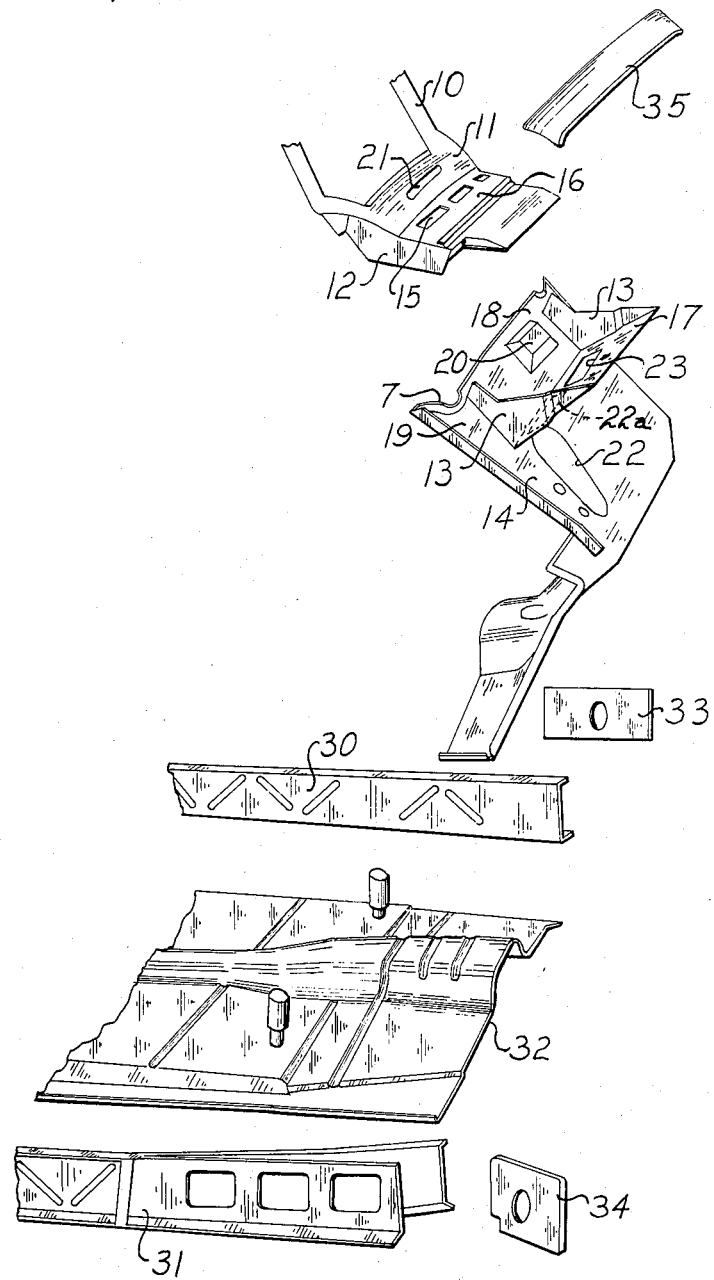
Figure 1 is a detailed perspective view illustrating in disassembled or exploded position certain of the parts making up my invention.
Figure 2:
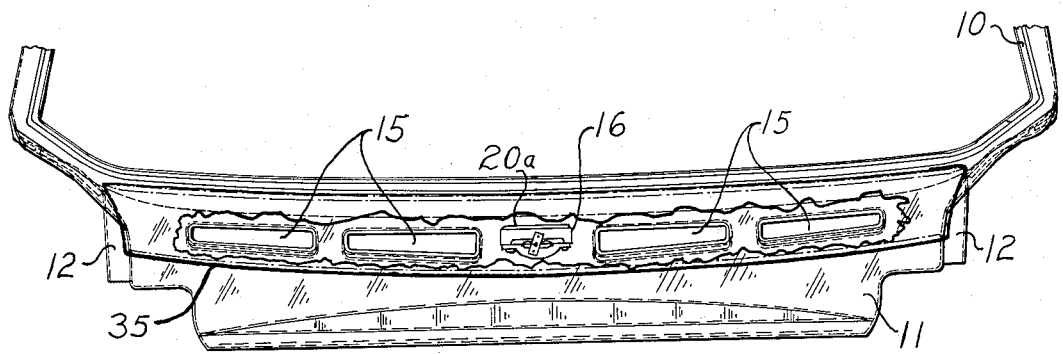
Figure 2 is a plan view of the cowl panel assembly.

Referring now more particularly to the drawings wherein like reference characters indicate like parts, it will be noted that there is illustrated fragmentarily, the windshield frame 10 and cowl panel assembly generally designated by the numeral 11. The cowl panel is arcuately shaped and provided with spaced end flange elements 12 which are joined to spaced end members 13 which are part of the dash and toe board assembly as designated by the numeral 14.

The cowl panel 11 is provided with enlarged spaced openings 15 which are arranged in line and extend clear across said panel. By joining cowl panel 11 to the dash assembly 14, as previously referred to, an enclosed chamber is effectively made up of the joined ends 12 and 13, the top which includes the ported section 16 of the cowl panel, the bottom including base 17, and the back portion 18 which is part of the dash board 19 itself.

In assembled relationship, the openings 15 therefore are in direct communication with the chamber as referred to above. This chamber may be referred to as a pressure chamber which will have a length nearly as great as that of the width of the dash 14.

The back portion 18 of the dash contains a mounting block 20 for a windshield wiper motor 20a. An extended longitudinal depression 21 is formed in the cowl immediately adjacent to the windshield for reinforcing purposes.

An opening 22 is formed in the dash board over which a heater assembly (not shown) is mounted. In operation air is delivered from the chamber through a suitable opening 22a in base 17 and forced over the heated coils of the heater and then such heated air is transferred into the interior of an automobile.

Figure 3:
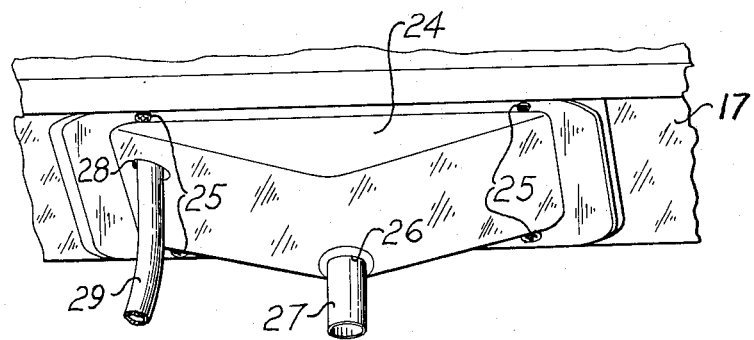
Figure 3 is a fragmentary perspective view of a portion of the dash board assembly showing the disposition of the windshield wiper motor cover.

The base 17 is provided with an enlarged rectangularly shaped opening 23 for access to the windshield wiper motor. This opening is closed by a motor access hold cover 24 which is rectangularly shaped at its base for ready mounting at 17 but has opposite sides extending or sloping gradually to form a somewhat funnel shaped body. In operative position, as shown in Figure 3, the base of the cover 24 is secured to the base 17 of the dash board by spaced cover mounting screws 25 with the top of the cover lying below the base 17. In this position moisture collected in the pressure chamber may flow down into the cover 24 and collect in one corner of the top of the cover. Such cover may be perforated at 26 in which a suitable drain tube 27 may be attached whereby such moisture may be readily discharged. The area 35 of cowl panel 11 is adequate to serve as a roof portion overlying the windshield wiper motor to substantially prevent rain water from striking the windshield wiper motor.

The cover 24 may also be perforated in one of its sides, as designated by numeral 28 through which a windshield wiper hose 29 may pass for supplying power to the windshield wiper motor.

The dash and toe board assembly is joined to the other parts of the car assembly in any suitable manner, these parts including the left rear and right rear of the side sill assembly being designated by numerals 30 and 31 respectively, the front floor pan assembly designated by the numeral 32, the left rear motor support bracket assembly designated by the numeral 33, and the side sill lower front end filler plate by the numeral 34.

The cowl cover, as designated by the numeral 35, extends entirely over the openings and is provided with the usual screen (not shown) to eliminate foreign material.

It is thought that the construction, manipulation, utility, and advantages of this invention will now be apparent to those skilled in this art without a more detailed description thereof.

The present embodiment of the invention has been described in considerable detail merely for the purpose of exemplification since in actual practice it attains the features of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim is:

1. A body construction for an automotive vehicle comprising a panel member forming a partition wall between the interior of the vehicle and the engine compartment of the vehicle, a shelf-like member having spaced end walls and a bottom wall, said end walls secured adjacent each end of said panel on the engine compartment side, a second panel member comprising part of a cowl assembly, said second panel comprising spaced end walls and a top wall, said last mentioned end walls arranged with said first mentioned end walls to form an enclosure made up of said shelf member and said second mentioned panel, said top wall provided with spaced apertures communicating directly with said enclosure, an opening formed in said bottom wall, a motor mounting block arranged on said first mentioned panel, said block arranged in line with said bottom wall opening, said enclosure wholly enclosing said motor block and extending to a point just short of the ends of said first mentioned panel.

2. A body construction for an automotive vehicle comprising an enclosure formed by a shelf arranged on a dash board of said vehicle and a panel included in a cowl panel assembly of said vehicle, said enclosure extending nearly the whole length of said cowl panel and having double end walls made up of spaced end flanges integral with said shelf and said cowl panel, an actuating mechanism mounted on said dash board, said actuating mechanism wholly enclosed by said enclosure.

References Cited in the file of this patent

UNITED STATES PATENTS

| | | |
|---|---|---|
| 1,869,551 | Earl | Aug. 2, 1932 |
| 2,295,750 | Norris et al. | Sept. 15, 1942 |
| 2,613,985 | Ulrich | Oct. 14, 1952 |